US010884474B2

(12) United States Patent
Sebastian et al.

(10) Patent No.: US 10,884,474 B2
(45) Date of Patent: Jan. 5, 2021

(54) METHOD FOR MANAGING NON-CHATTY IOT DEVICES TO REMAIN IN AN AUTHENTICATED STATE

(71) Applicant: HEWLETT PACKARD ENTERPRISE DEVELOPMENT LP, Houston, TX (US)

(72) Inventors: Celestian K. Sebastian, Bangalore (IN); Anil Sudharsanan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 88 days.

(21) Appl. No.: 16/039,798

(22) Filed: Jul. 19, 2018

(65) Prior Publication Data

US 2020/0026339 A1 Jan. 23, 2020

(51) Int. Cl.
*G06F 1/32* (2019.01)
*G06F 1/3209* (2019.01)
*H04W 52/02* (2009.01)
*H04L 12/24* (2006.01)
*H04L 29/06* (2006.01)

(52) U.S. Cl.
CPC ........ *G06F 1/3209* (2013.01); *H04L 41/0866* (2013.01); *H04L 41/12* (2013.01); *H04L 63/0876* (2013.01); *H04W 52/0229* (2013.01); *H04W 52/0238* (2013.01)

(58) Field of Classification Search
CPC .................................... G06F 1/32; G06F 9/44
See application file for complete search history.

(56) References Cited

U.S. PATENT DOCUMENTS

| 8,010,821 | B2  |   | 8/2011  | Edwards et al. |
|-----------|-----|---|---------|---------------------------|
| 9,681,357 | B1  | * | 6/2017  | Mawrey .................. H04L 67/26 |
| 9,749,955 | B2  |   | 8/2017  | Min et al. |
| 2006/0209705 | A1 | * | 9/2006 | Sauter ..................... H04L 63/08 370/252 |
| 2006/0225129 | A1 | * | 10/2006 | Inoue ..................... H04L 63/08 726/3 |
| 2009/0205038 | A1 |   | 8/2009 | Kumar et al. |
| 2011/0191610 | A1 | * | 8/2011 | Agarwal ............... G06F 1/3203 713/310 |
| 2014/0372576 | A1 | * | 12/2014 | Mohandas .......... H04L 41/0803 709/220 |

(Continued)

OTHER PUBLICATIONS

Sleep, Sense, Connect: Low-power Iot Design, (Web Page), Retrieved Jun. 20, 2018, 21 Pgs., http://www.electronicdesign.com/embedded-revolution/sleep-sense-connect-low-power-iot-design.

*Primary Examiner* — Keshab R Pandey
(74) *Attorney, Agent, or Firm* — McDermott Will & Emery

(57) ABSTRACT

Methods for managing non-chatty IoT devices in a network are provided. In one aspect, a method includes receiving classification information identifying that an internet IoT device is connected to a port of a switch and determining that the IoT device has been inactive for a predetermined threshold period of time based on a logoff timer configured for the port. The IoT device is woken up from a power-save mode based on a guaranteed wakeup timer of the IoT device or a Wake-on-LAN packet sent to the IoT device by the switch. The logoff timer is then resent, causing the IoT device to remain in an authenticated state. Systems and machine-readable media are also provided.

19 Claims, 9 Drawing Sheets

(56) References Cited

U.S. PATENT DOCUMENTS

| | | | |
|---|---|---|---|
| 2015/0103756 A1* | 4/2015 | Sinha | H04B 7/0491 |
| | | | 370/329 |
| 2016/0366644 A1 | 12/2016 | Ghosh et al. | |
| 2019/0104128 A1* | 4/2019 | Carol | H04L 9/3226 |

* cited by examiner

METHOD FOR MANAGING NON-CHATTY IOT DEVICES TO REMAIN IN AN AUTHENTICATED STATE

BACKGROUND

The Internet of Things (IOT) provides for internetworking of physical devices that may have sensors and actuators, as well as network connectivity and processing logic to gather, process and exchange data among themselves and/or a networked element. For example, IoT devices may be heat sensors, smart light bulbs, smart kitchen devices, printers, cameras, and any other smart devices embedded with a computing system that enables these smart devices to connect and exchange data over the internet. This capability allows objects to be sensed and controlled remotely across a network infrastructure, which leads to direct integration of the physical world with a digital infrastructure. The IoT devices sense data and either update periodically or when there is a change above/below a threshold. During the rest of the time the IoT devices are silent (e.g., non-chatty). Thus, the silent IoT devices may become logged off from the network because the Mac-based authentication has a log-off period that expires during this silence period. When an IoT device comes alive with new time critical information, it finds itself outside the network, and has to re-authenticate to become logged back in to the network. The availability of connection servers, connection latency, and other issues may increase the login time and lead to a delay in processing the new time critical information.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
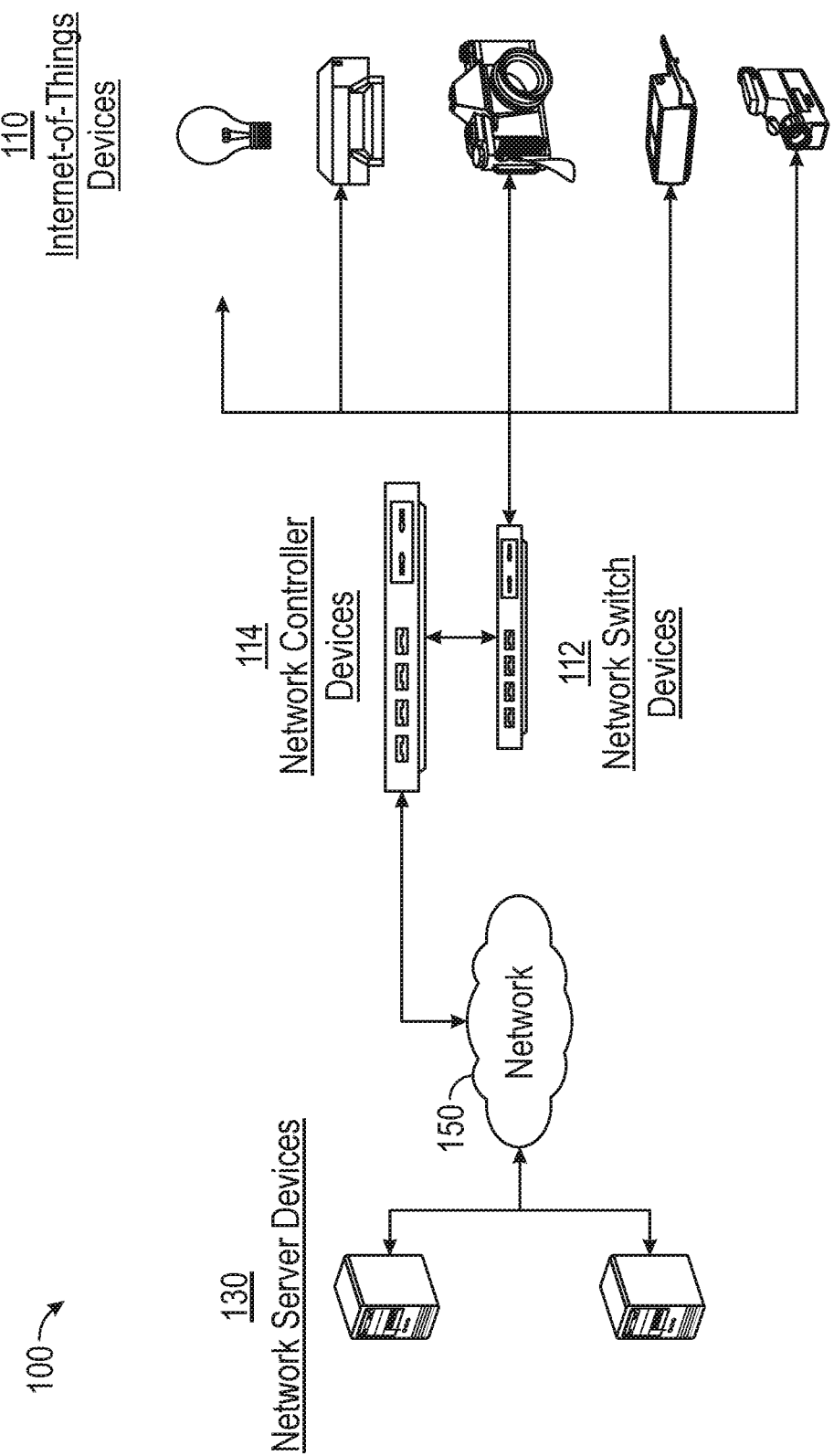
FIG. 1 illustrates an example architecture for managing non-chatty IoT devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for managing non-chatty IoT devices in a network in order to maintain the IoT devices in an authenticated state. For a battery powered IoT device, putting the IoT device to sleep when inactive is important to extend the service life. Such IoT devices may use a variety of power-save mechanisms, shutting down less-important modules, periodic polling, and the like. For many IoT devices, the actions of the IoT device is to report a fluctuation in a value above or below a threshold, or report a movement, for example. Thus, whenever the monitored parameters are within an acceptable range, the IoT device will likely be idle and will not send any data. However, when there is data to be sent, it may be critical to process the data ASAP. For example, the data may indicate a breach in the system or a threat. In case of an IoT device associated with medical equipment, the data could be as critical as saving a life. Accordingly, the disclosed system provides for reducing latency when an IoT device comes live.

If such an IoT device is in power-save mode for more than a set log-off period in an authentication mechanism or process, a networking connection device, such as a remote authentication dial-in user service (RADIUS) server, may treat the device as no longer in the system, thus clearing the data related to the IoT device and effectively removing the authentication of the IoT device. Typically, a default setting for a log-off period on network switches may be 300 seconds, which is a very probable duration for power-save sleep of a device. In this case, the IoT device (e.g., client) will be de-authenticated after 300 seconds. When the IoT device wakes up, it has to wait for a re-authentication process to succeed in order to restore the connectivity of the IoT device to the network. The process of reconnecting the IoT device may be further delayed by unavailability of a RADIUS server, connectivity latency or other network issues. Given such connectivity issues, the process delays the consumption of the data being reported by the IoT device.

IoT device profiling and device fingerprinting are technologies used to identify and group IoT devices under specific classifications. For example, fingerprinting may be achieved by any or all packets sent from the IoT device for fingerprinting data. A Mac organizationally unique identifier (OUI) may be used for fingerprinting data, though any other fields in any standard packets may be used. This allows an administrator to configure a specific category of configurations for each group. For a non-chatty IoT device, the administrator could use a high value for a log-off period of a Mac based authentication process. In some cases, this would lead to disabling the log-off period, as there is no guaranteed power-save wakeup period for many IoT devices. This situation then leads to a security threat of the IoT device being always authenticated, even if it is non-functional and removed from the network or its current physical location.

The disclosed system provides for creating a guaranteed wakeup timer for the IoT devices. Such a guaranteed wakeup timer is a vendor specific change and may involve support from manufacturers of IoT device. The guaranteed wakeup timer period may be advertised along with other parameters of the IoT device. For example, it may be a new Link Layer Detection Protocol (LLDP) type-length-value (TLV) element, where for this part of the message, "type" is a binary code that indicates the kind of field that represents, "length" is the size of the value field (e.g., in bytes) and "value" is a variable-sized series of bytes that contain data. LLDP has 127 TLV type values from 0 to 127, with TLV types 0-8 and 127 being defined and TLV types 9-126 being reserved for additional or future use. The switch may then read the wakeup time value stored in the appropriate TLV type. With such guaranteed wakeup timer support, a configuration server may configure a larger value for the log-off period than the set wakeup period on the connected ports.

Many IoT devices support a response for packets termed as Wake-on-LAN. Here, when such a Wake-on-LAN packet is received on the networking interface, the IoT device will wake up. This Wake-on-LAN feature may be used for checking the IoT device availability, and to further keep the IoT device in an authenticated state. For example, a non-chatty IoT device may have a configured value for the log-off period set to 20 seconds.

The disclosed system provides for a Wake-on-LAN module in the network switch or router. The Wake-on-LAN module may be configured to send Wake-on-LAN packets on any connected port. Thus, the Wake-on-LAN module may watch or monitor for packets from each IoT device. When an IoT device enters power-save mode and sleeps, or if there is no data to be exchanged, the Wake-on-LAN module may determine the last-packet time and the inactivity period for the IoT device. Once the inactivity period reaches a threshold (e.g., 15 seconds), the Wake-on-LAN module forms a Wake-on-LAN packet and sends the Wake-on-LAN packet on the port to which the IoT device is connected. When received by the IoT device, the Wake-on-LAN packet will wake the IoT device up, and the IoT device will exchange packets (e.g., LLDP and/or proprietary packets). This event will refresh the Mac-authentication state and the IoT device will stay in authenticated state for another log-off period, such as the 20 second log-off period in the example discussed above. This Wake-on-LAN pattern may repeat periodically as long as the inactivity timer reaches the threshold inside the log-off period.

However, if a particular IoT device is nonfunctional, or removed from the network, Wake-on-LAN packets will not cause a successful refresh of the authentication state of that particular IoT device. That IoT device will then be removed from the cache of the connection server and require a re-authentication sequence if that particular IoT device is to be restored back into the network. Thus, the disclosed system may avoid and/or overcome a security threat of an inactive device always being authenticated after removal from the network.

In one or more embodiments of the present disclosure, a method is described that includes receiving classification information identifying that an IoT device is connected to a port of a switch. The method also includes determining that the IoT device has been inactive for a predetermined threshold period of time based on a logoff timer configured for the port. The method further includes transmitting a first packet from the switch to the IoT device, wherein the first packet comprises a wake-on-LAN packet. The method also includes receiving a second packet from the IoT device in response to the first packet. The method further includes resetting the logoff timer, wherein resetting the logoff timer causes the IoT device to remain in an authenticated state.

In one or more embodiments of the present disclosure, a system is described that includes a memory storing instructions and one or more processors configured to execute the instructions to receive classification information identifying that an internet of things (IoT) device is connected to a port of a switch and configure a logoff timer for the port based on configuration data of the IoT device. The instructions also cause the one or more processors to determine that the IoT device has been inactive for a predetermined threshold period of time based on the logoff timer. The instructions further cause the one or more processors to receive a packet from the IoT device in response to a wakeup signal and reset the logoff timer, wherein resetting the logoff timer causes the IoT device to remain in an authenticated state.

In one or more embodiments of the present disclosure, a non-transitory, machine readable medium is described that includes instructions, which when executed by one or more processors, cause a computer to perform a method, the method including receiving classification information identifying that an IoT device is connected to a port of a switch. The method also includes determining that the IoT device has been inactive for a predetermined threshold period of time based on a logoff timer configured for the port. The method further includes transmitting a first packet from the switch to the IoT device, wherein the first packet comprises a wake-on-LAN packet. The method also includes receiving a second packet from the IoT device in response to the first packet. The method further includes resetting the logoff timer, wherein resetting the logoff timer causes the IoT device to remain in an authenticated state.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture 100 for managing non-chatty IoT devices over a network. The architecture 100 includes IoT devices 110, network switch devices 112, network controller devices 114, and network server devices 130 connected over a network 150.

At least one network server device 130 is configured to host a Mac authentication application that receives Mac authentication information from a network switch device 112 and returns confirmation of Mac authentication success to the network switch device 112. At least one network controller device 114 is configured to host a device profiling and/or device fingerprinting database that receives device profiling/fingerprinting information from a network switch device 112 and returns switch port configuration information to the network switch device 112. For purposes of load balancing, multiple network switch devices 112 can host the Mac authentication application and multiple network server devices 130 can host the device profiling/fingerprinting database.

The network switch device 112, network controller device 114, and network server device 130 can be any device having an appropriate processor, memory, and communications capability for hosting the respective applications and databases. For example, the network switch device 112, network controller device 114, and network server device 130 may be any device including but not limited to an access point, a wireless controller, a network controller, a server, and any form of virtualized computing appliance. In certain aspects, one or more of the network switch device 112, network controller device 114, and network server device 130 can be a cloud computing server of an infrastructure-as-a-service (IaaS) and be able to support a platform-as-a-service (PaaS) and software-as-a-service (SaaS) services. The IoT devices 110 can be, for example, heat sensors, smart light bulbs, smart kitchen devices, printers, cameras, medical monitoring devices (e.g., heart rate, temperature, respiration, brain activity and the like) or any other devices having appropriate embedded processor, memory, and communications capabilities.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed system manages the IoT devices 110 over the network 150 using timers. For example, after connecting and authentication data from the IoT device 110, the network switch device 112 confirms Mac authentication of the IoT device with the network server device 130, identifies the device profile/fingerprint of the IoT device 110 and obtains a switch port configuration from the network controller device 114. In some aspects, the network switch device 112 obtains the device profile/fingerprint by retrieving the device profile from storage in a memory of the network switch device 112. In other aspects, the network switch device 112 obtains the device profile by downloading from a device profile database of the network server device 130 via a secure networking protocol such as Hypertext Transfer Protocol Secure (HTTPS) protocol. After the IoT device 110 is connected to a port of the network switch device 112, the disclosed system maintains the IoT device 110 in an authenticated state by using a guaranteed wakeup timer in the IoT device 110 or by sending a wake-on-LAN packet to the IoT device 110 after a predetermined threshold inactivity period.

Example Non-Chatty IoT Device Management System

Figure 2:
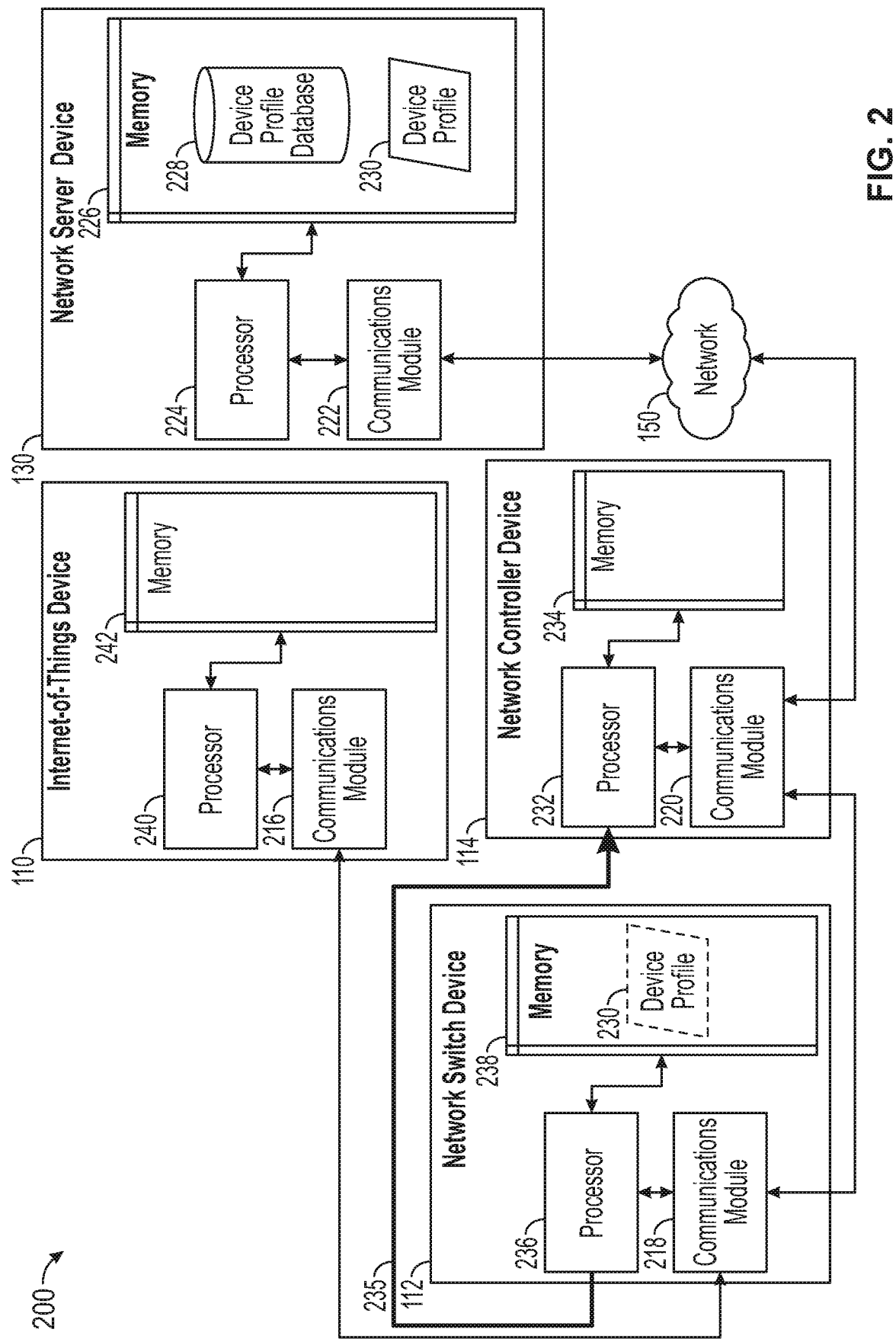
FIG. 2 is a block diagram illustrating example IoT, network switch, network controller and network server devices from the architecture of FIG. 1 according to certain aspects of the disclosure.

FIG. 2 is a block diagram illustrating an example IoT device 110, network switch device 112, network controller device 114, and network server device 130 in the architecture 100 of FIG. 1 according to certain aspects of the disclosure.

The IoT device 110, the network switch device 112, the network controller device 114, and the network server device 130 are connected over the network 150 via respective communications modules 216, 218, 220, and 222. While communication module 216 is configured to interface with communications module 218, which is configured to interface with communications module 220, the communications modules 220 and 222 are configured to interface with the network 150 to send and receive information, such as data, requests, responses, and commands to other devices on the network. The communications modules 216, 218, 220, and 222 can be, for example, modems or Ethernet cards.

The network server device 130 includes a processor 224, the communications module 222, and a memory 226 that includes a device profile database 228. The processor 224 of the network server device 130 is configured to execute instructions, such as instructions physically coded into the processor 224, instructions received from software in memory 226, or a combination of both. For example, the processor 224 of the network server device 130 executes instructions, responsive to receiving a REpresentational State Transfer (REST) query from the network switch device 112, to transmit a device profile 230 to the network switch device 112.

The network controller device 114, for example a wireless local access network (WLAN) controller, includes a processor 232, the communications module 220, and a memory 234. The processor of the network controller device 114 is configured to execute instructions, such as instructions physically coded into the processor 232, instructions received from software in memory 234, or a combination of both. For example, the processor 232 of the network controller 114 executes instructions, responsive to receiving a request from the network switch 112 to transmit a port configuration to the network switch device 112 based on an IoT device profile/fingerprint. The processor 232 of the network controller device 114 also executes instructions to receive, from the network switch device 112, the data received from the IoT device 110.

The network switch device 112 includes a processor 236, the communications module 218, and a memory 238. In certain aspects, the network switch device 112 is deployed at an edge segment of the network 150. The processor of the network switch device 112 is configured to execute instructions, such as instructions physically coded into the processor 236, instructions received from software in memory 238, or a combination of both. For example, the processor 236 of the network switch device 112 executes instructions to receive data originated from the IoT device 110 and identify a device type of the IoT device 110 by analyzing data packets of the received data.

The processor 236 of the network switch 112 also executes instructions to obtain a device profile, such as the device profile 230. In certain aspects, the instruction to obtain the device profile 230 includes instructions to retrieve the device profile 230 from storage of its memory 238. Additionally or alternatively, however, if there is no matching device profile in storage of the memory 238 of the network switch device 112, then the processor 236 executes instructions to transmit the REST query to the network server device 130 via a secure networking protocol, such as HTTPS protocol, and download the device profile 230 from the device profile database 228 of the network server device 130 via the secure networking protocol. The device profile 230 is illustrated in phantom in the memory 238 of the network switch device 112 to depict instances when the device type of the IoT device 110 does not match any device profile from storage in the memory 238.

The processor 236 of the network switch device 112 also executes instructions to manage the IoT device 110 by using a logoff timer configured for the connection port of the IoT device 110 based on a predetermined IoT device inactivity time period. In certain aspects, the instructions to manage the IoT device 110 further includes instructions to transmit a Wake-on-LAN packet to the IoT device 110 to bring the IoT device 110 out of power-save mode. In certain aspects, the instructions to manage the IoT device 110 further include instructions to receive a response packet (e.g., LLDP packet) from the IoT device 110 and to reset the logoff timer of the connection port of the network switch device 112.

In certain aspects, the instructions to manage the IoT device 110 include determining whether a guaranteed wakeup timer is configured on the IoT device 110, such as by an LLDP element advertised by the IoT device 110. For example, using one of reserved time-length-value (TLV) types 9-126 of the LLDP to provide a wakeup time value. In certain aspects, the classification information is based on device profiling or fingerprinting. In certain aspects, the instructions to manage the IoT device 110 include sending the device profile to the network controller device 114, receiving a port configuration from the network controller device 114 based on the device profile, and configuring the port of the network switch device 112 based on the port configuration. In certain aspects, the instructions to manage the IoT device 110 include sending the device fingerprint to the network controller device 114, receiving a port configuration from the network controller device 114 based on the device fingerprint, and configuring the port of the network switch device 112 based on the port configuration.

In certain aspects, the instructions to manage the IoT device 110 include changing the logoff timer configured for the port of the network switch device 112 to match a timer configuration of the IoT device 110. In certain aspects, the instructions to manage the IoT device 110 include using an inactivity timer for the determining that the IoT device 110 has been inactive for the predetermined threshold period of time. In certain aspects, the instructions to manage the IoT device 110 include sending authentication information associated with the IoT device 110 to the network server device 130 (e.g., radius server) and receiving confirmation of authentication success from the radius server. In certain aspects, the instructions to manage the IoT device 110 include logging off the IoT device 110 if the IoT device 110 is nonfunctional or removed from the network 150.

In certain aspects, the instructions to manage the IoT device 110 include configuring a logoff timer for the port based on configuration data of the IoT device 110, and receiving a packet from the IoT device 110 in response to a wakeup signal. In certain aspects, the instructions to manage the IoT device 110 include wherein the wakeup signal is based on a guaranteed wakeup timer advertised by the IoT device 110. In certain aspects, the instructions to manage the IoT device 110 include wherein the wakeup signal is a Wake-on-LAN packet sent from the network switch device 112 to the IoT device 110. In certain aspects, the instructions to manage the IoT device 110 include authenticating the IoT device 110 by the network server device 130 based on authentication data associated with the IoT device 110 and configuring the port of the switch by a network controller device based on one of a device profile and a device fingerprint associated with the IoT device. In certain aspects, the instructions to manage the IoT device 110 include determining whether a guaranteed wakeup timer is configured on the IoT device, wherein the guaranteed wakeup timer is advertised by the IoT device via a link layer discovery protocol (LLDP).

The IoT device 110 includes a processor 240, the communications module 216, and a memory 242. The processor 240 of the IoT device 110 is configured to execute instructions, such as instructions physically coded into the processor 240, instructions received from software in memory 242, or a combination of both. For example, the processor 240 of the IoT device 110 executes instructions to transmit data, including data packets, to the network switch device 112. In certain aspects, the instructions include sending a guaranteed wakeup timer configuration of the IoT device 110 to the network switch device 112. In certain aspects, the instructions include sending device connection and authentication information to the network switch device 112. In certain aspects, the instructions include placing the IoT device 110 into power-save mode based upon predetermined time parameters. In certain aspects, the instructions include waking the IoT device 110 out of power-save mode based on a guaranteed wakeup timer of the IoT device 110. In certain aspects, the instructions include waking the IoT device 110 out of power-save mode based on receiving a Wake-on-LAN packet from the network switch device 112.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
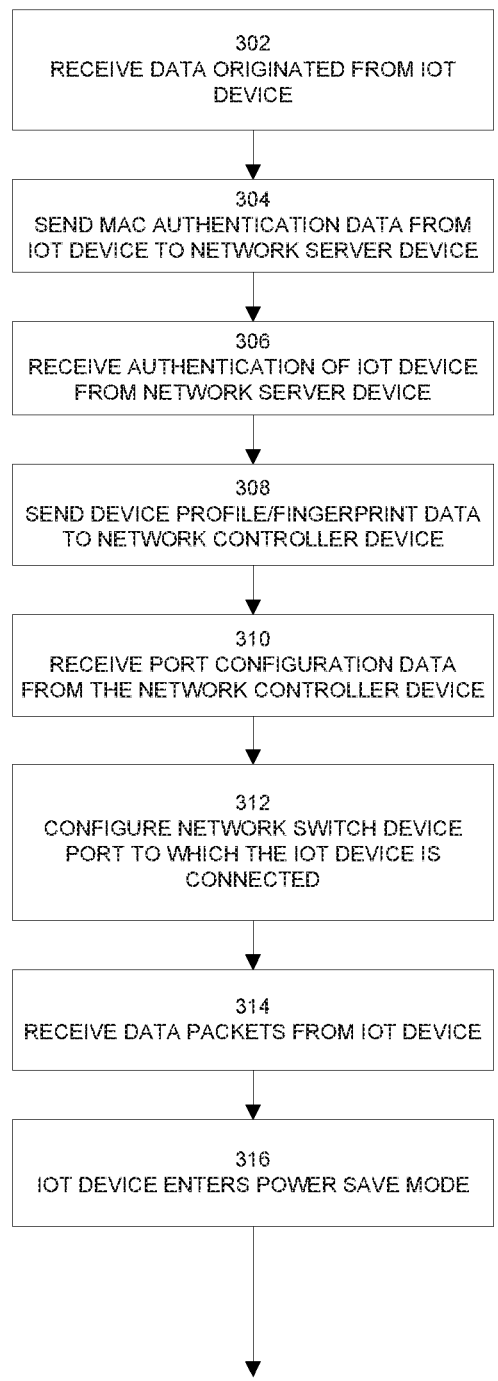
FIG. 3 illustrates an example process for managing a non-chatty IoT device using the example client/server of FIG. 2.
Figure 3B:
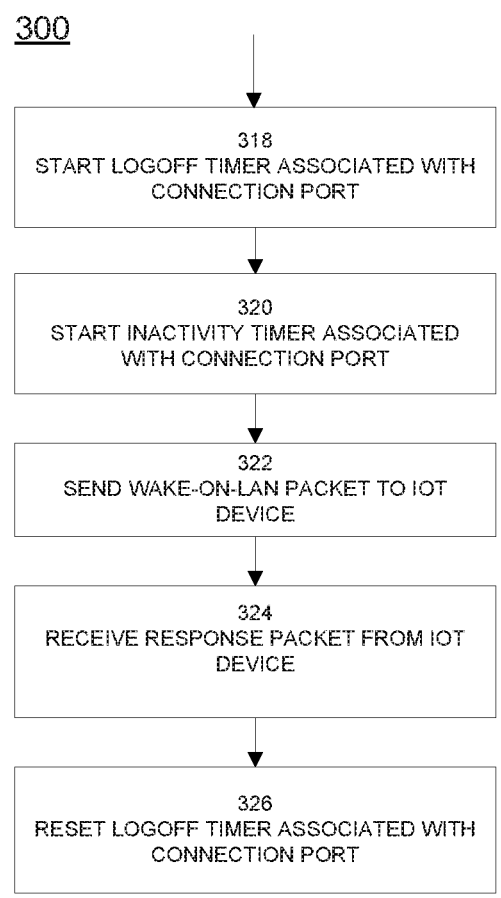

FIG. 3 illustrates a process 300 for managing a non-chatty IoT device in a network using the example IoT, network switch, network controller and network server devices 110, 112, 114, 130 of FIG. 2. While FIG. 3 is described with reference to FIG. 2, it should be noted that the process steps of FIG. 3 may be performed by other systems.

The process 300 begins in step 302 when the network switch device 112 receives connection and authentication data originated from the IoT device 110. Next, in step 304, the network switch 112 sends Mac authentication data associated with the IoT device 110 to the network server device 130. At step 306, the network server device 130 sends confirmation of Mac authentication success of the IoT device 110 to the network switch device 112. The network switch device 112 sends device profiling/fingerprinting data to the network controller device 114 in step 308. In step 310, the network controller device 114 sends port configuration data to the network switch device 112. The port configuration data is used by the network switch device 112 to configure the switch port to which the IoT device 110 is connected in step 312.

The process 300 continues in step 314 by the IoT device 110 sending data packets to the network switch device 112 as dictated by operating parameters of the IoT device 110. For example, the IoT device may be a heart rate monitor that is configured to send warning data to the network switch device 112 only when a patient's heart rate drops below or rises above a defined heartbeat range (e.g., 55-70 beats per minute). The IoT device 110 may be any other medical device (e.g., temperature monitor, brain wave monitor, respiration monitor, medical gas delivery monitor and the like), a camera, a light bulb, a garage door opener, a light timer, a thermostat or any other devices having appropriate embedded processor, memory, and communications capabilities. The IoT device 110 enters a power-save mode in step 316, such as after a predetermined time period following the last data packet transmission from the IoT device 110. Continuing in step 318, a logoff timer associated with the connection port is started by the network switch device 112. Similarly, an inactivity threshold timer associated with the connection port is started by the network switch device 112 in step 320. In step 322, the network switch device 112 sends a Wake-on-LAN packet to the IoT device 110 upon expiration of the inactivity threshold timer. The IoT device 110 sends a response packet to the network switch device 112 in step 324. The process 300 ends in step 326 by resetting the logoff timer associated with the connection port, thereby maintaining the IoT device 110 in an authenticated state.

If the IoT device 110 becomes disabled (e.g., breaks down) or is removed from the network (e.g., taken out of service for maintenance or moved to another location), the IoT device will have to reconnect and re-authenticate by starting the process 300 over again at step 302. This provides increased security as the IoT device 110 cannot remain in an authenticated state if it is disabled or removed from the network, thus preventing an intrusion to the network through a permanently authenticated IoT device.

Figure 4:
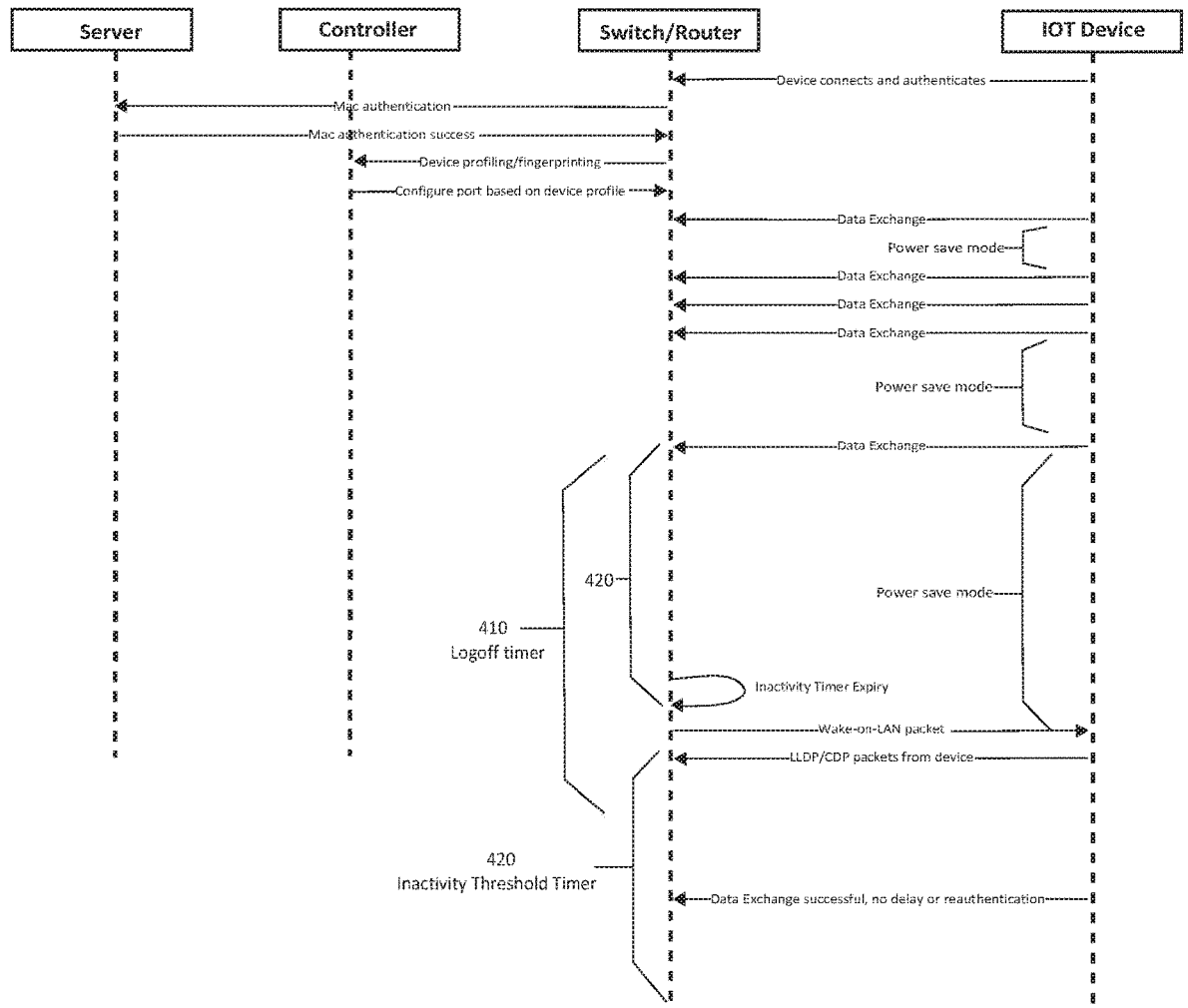
FIG. 4 is an example illustration associated with the example process of FIG. 3

FIG. 4 illustrates a sequence diagram showing example packet exchange and timer usage amongst various components of the disclosed system described in process 300. An IoT device 110 initially connects and authenticates to a network switch device 112, which includes the network switch device 112 confirming Mac authentication success from a network server device 130 and configuring a network switch device 112 port for connection to the IoT device 110 based on a port configuration received from a network controller device 114. The IoT device 110 then sends data packets to the network switch device 112 based on operating parameters of the IoT device 110 (e.g., if a monitored value goes above or below a predetermined threshold value). To conserve battery life or power consumption, the IoT device 110 goes into power-save mode based on predetermined lack of activity and/or timing parameters. A logoff timer 410 is associated with the port of the network switch device 112 to which the IoT device is connected, the logoff timer 410 causing the IoT device 110 to be logged off of the disclosed system/network after a set period of time. An inactivity timer 420 is set for a shorter time interval than the logoff timer 410, such that a Wake-on-LAN packet is sent to the IoT device 110 to wake the IoT device 110 up from power-save mode before the logoff timer 410 expires, keeping the IoT device 110 in an authenticated and logged on state.

Figure 5A:
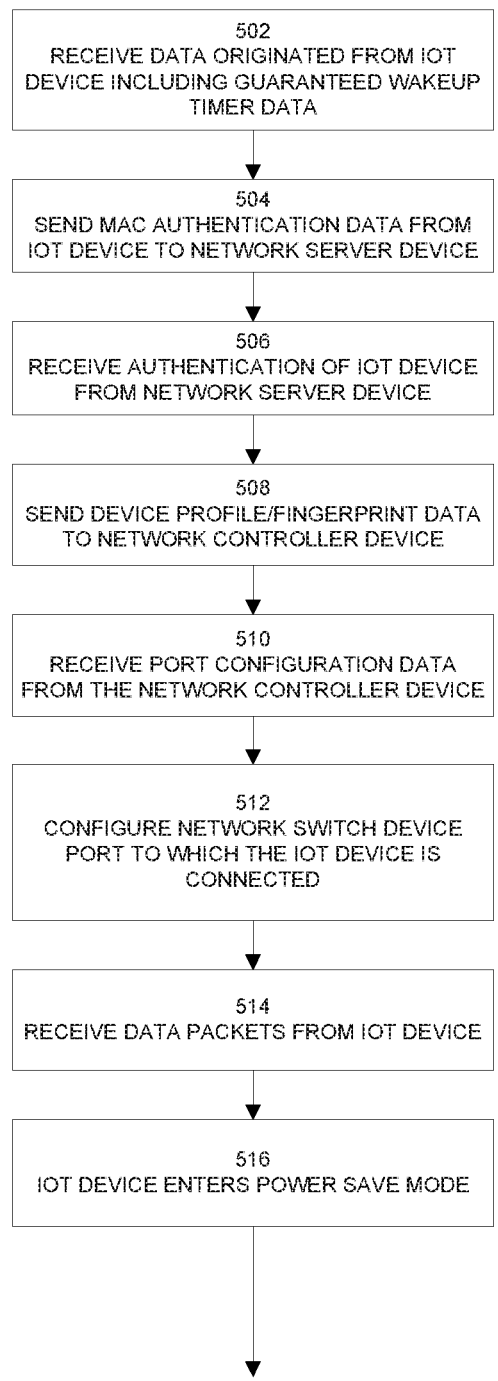
FIG. 5 illustrates an example process for managing a non-chatty IoT device using the example client/server of FIG. 2.
Figure 5B:
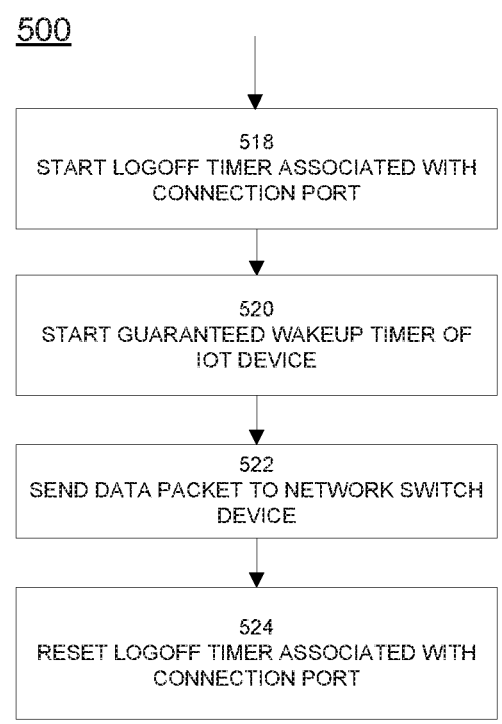

FIG. 5 illustrates a process 500 for managing a non-chatty IoT device in a network using the example IoT, network switch, network controller and network server devices 110, 112, 114, 130 of FIG. 2. While FIG. 5 is described with reference to FIG. 2, it should be noted that the process steps of FIG. 5 may be performed by other systems.

Process 500 begins in step 502 when the network switch device 112 receives connection and authentication data originated from the IoT device 110. Here, the connection and authentication data includes a guaranteed timer wake up period configured in the IoT device 110. Next, in step 504, the network switch 112 sends Mac authentication data associated with the IoT device 110 to the network server device 130. At step 506, the network server device 130 send confirmation of Mac authentication success of the IoT device 110 to the network switch device 112. The network switch device 112 sends device profiling/fingerprinting data, including the guaranteed timer wakeup period, to the network controller device 114 in step 508. In step 510, the network controller device 114 sends port configuration data to the network switch device 112. The port configuration data includes a logoff time period for the port that is longer than the guaranteed timer wake up period of the IoT device 110. The port configuration data is used by the network switch device 112 to configure the switch port to which the IoT device 110 is connected in step 512.

The process 500 continues in step 514 by the IoT device 110 sending data packets to the network switch device 112 as dictated by operating parameters of the IoT device 110. For example, the IoT device may be a video camera that is configured to send video image data to the network switch device 112 only when movement is detected within the video camera's field of view. The IoT device 110 enters a power-save mode in step 516, such as after a predetermined time period following the last data packet transmission from the IoT device 110. Continuing in step 518, a logoff timer associated with the connection port is started by the network switch device 112. A guaranteed wakeup timer is started by the IoT device 110 in step 520. In step 522, the IoT device 110 sends a data packet to the network switch device 112 upon expiration of the guaranteed wakeup timer. The data packet indicates that the IoT device is still active. The process 500 ends in step 524 by resetting the logoff timer associated with the connection port, thereby maintaining the IoT device 110 in an authenticated state.

Figure 6:
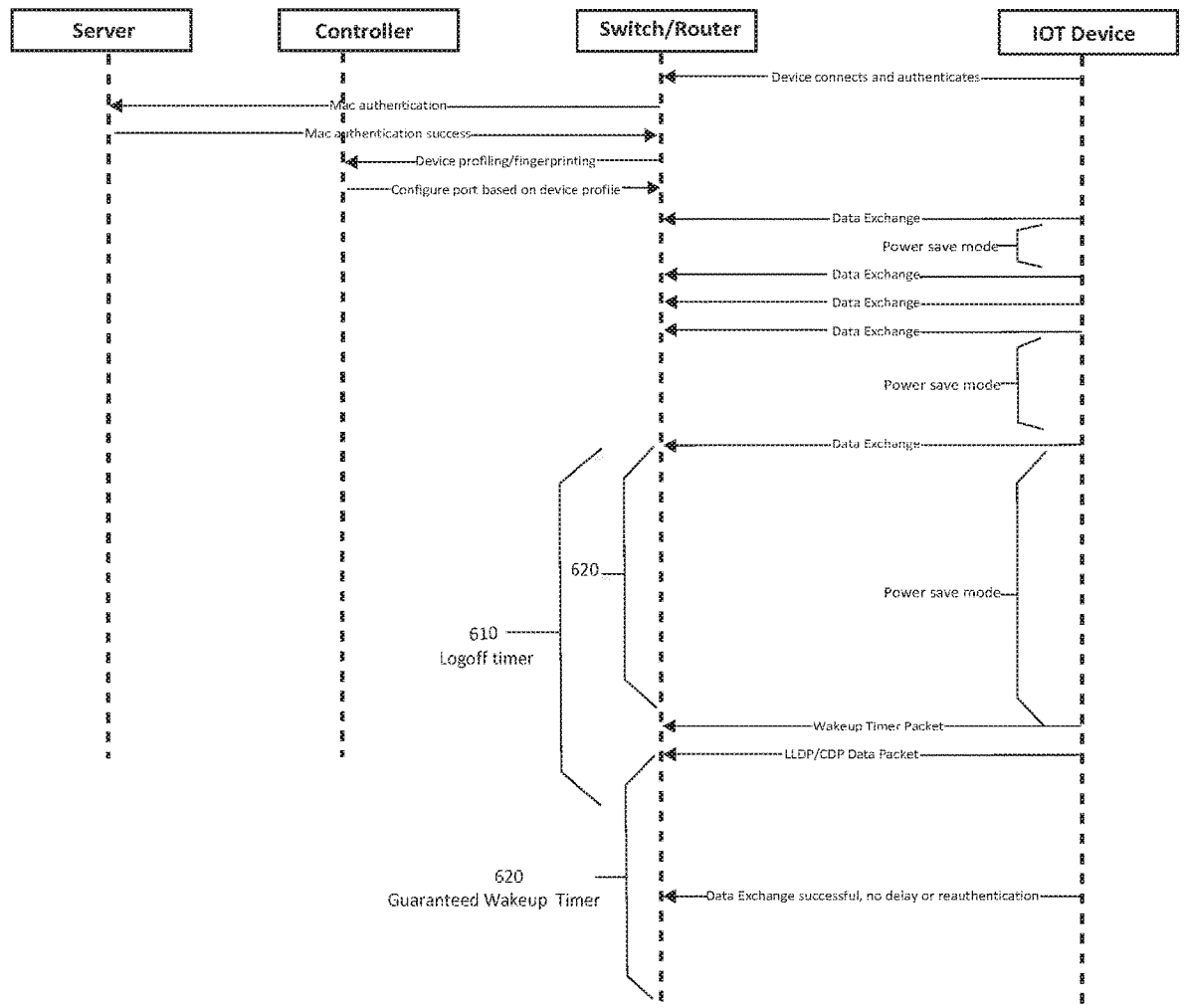
FIG. 6 is an example illustration associated with the example process of FIG. 5.

FIG. 6 illustrates a sequence diagram showing example packet exchange and timer usage amongst various components of the disclosed system described in process 500. An IoT device 110 initially connects and authenticates to a network switch device 112, which includes the network switch device 112 confirming Mac authentication success from a network server device 130 and configuring a network switch device 112 port for connection to the IoT device 110 based on a port configuration received from a network controller device 114. The port configuration includes a time period for a logoff timer 610 based on the time period of a guaranteed wakeup timer 620 in the IoT device 110. The IoT device 110 then sends data packets to the network switch device 112 based on operating parameters of the IoT device 110 (e.g., if movement is detected in a viewing field of a video camera). To conserve battery life or power consumption, the IoT device 110 goes into power-save mode based on predetermined lack of activity and/or timing parameters. The logoff timer 610 causes the IoT device 110 to be logged off of the disclosed system/network after a set period of time. Because the guaranteed wakeup timer 620 is set for a shorter time interval than the logoff timer 610, the IoT device 110 is woken up from power-save mode before the logoff timer 610 expires. The woken up IoT device 110 then sends a data packet to the network switch device 112, keeping the IoT device 110 in an authenticated and logged on state.

Hardware Overview

Figure 7:
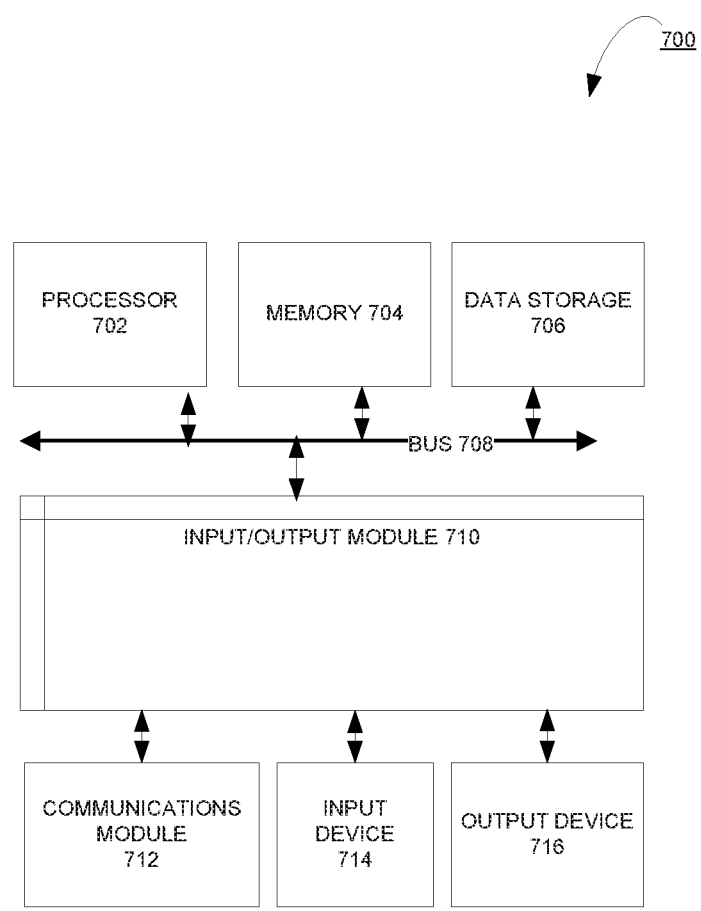
FIG. 7 is a block diagram illustrating an example computer system with which the IoT, network switch, network controller and network server devices of FIG. 2 can be implemented.

FIG. 7 is a block diagram illustrating an example computer system 700 with which the IoT, network switch, network controller and network server devices 110, 112, 114, 130 of FIG. 2. can be implemented. In certain aspects, the computer system 700 may be implemented using hardware or a combination of software and hardware, either in a dedicated server or integrated into another entity or distributed across multiple entities.

Computer system 700 (e.g., IoT device 110, network switch device 112, network controller device 114 or network server device 130) includes a bus 708 or other communication mechanism for communicating information, and a processor 702 (e.g., processor 224, 232, 236 and 240) coupled with bus 708 for processing information. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 226, 234, 238 and 242), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single in Line Memory Module) card interface. Such expansion memory may provide extra storage space for computer system 700 or may also store applications or other information for computer system 700. Specifically, expansion memory may include instructions to carry out or supplement the processes described above and may include secure information also. Thus, for example, expansion memory may be provided as a security module for computer system 700 and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communications modules 216, 218, 220 and 222) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MIMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the process example, a network device 112, 114, 130 might transmit code to maintain authentication of an IoT device 110 through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 and/or an output device 716. Example input devices 714 include a stylus, a finger, a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the IoT device 110, network switch device 112, network controller device 114 and network server device 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer or IoT device having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box. Computer system 700 can also be any IoT devices, such as heat sensors, smart light bulbs, smart kitchen devices, printers, cameras and any other smart devices enabled to connect and exchange data over the internet.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "example" or "exemplary" is used herein to mean "serving as an example, instance, or illustration." Any embodiment described herein as an "example" or "exemplary" is not necessarily to be construed as preferred or advantageous over other embodiments.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   receiving classification information identifying that an internet of things (IoT) device is connected to a port of a switch;
   determining that the IoT device has been inactive for a predetermined threshold period of time based on a logoff timer configured for the port;
   transmitting a first packet from the switch to the IoT device, wherein the first packet comprises a Wake-on-LAN packet;
   receiving a second packet from the IoT device in response to the first packet;
   resetting the logoff timer, wherein resetting the logoff timer causes the IoT device to remain in an authenticated state;
   authenticating the IoT device by a network server based on authentication data associated with the IoT device; and
   configuring the port of the switch by a network controller based on one of a device profile and a device fingerprint associated with the IoT device.

2. The method of claim 1, further comprising determining whether a guaranteed wakeup timer is configured on the IoT device.

3. The method of claim 2, wherein the guaranteed wakeup timer is advertised by the IoT device via a link layer discovery protocol (LLDP).

4. The method of claim 3, further comprising using one of reserved time-length-value (TLV) types 9-126 of the LLDP to provide a wakeup time value.

5. The method of claim 1, wherein the classification information is based on the device profile.

6. The method of claim 5, further comprising:
   sending the device profile to a network controller; and
   receiving a port configuration from the network controller based on the device profile, wherein configuring the port of the switch is based on the port configuration.

7. The method of claim 1, wherein the classification information is based on the device fingerprint.

8. The method of claim 7, further comprising:
   sending the device fingerprint to a network controller; and
   receiving a port configuration from the network controller based on the device fingerprint, wherein configuring the port of the switch is based on the port configuration.

9. The method of claim 1, further comprising changing the logoff timer configured for the port of the switch to match a timer configuration of the IoT device.

10. The method of claim 1, further comprising using an inactivity timer for the determining that the IoT device has been inactive for the predetermined threshold period of time.

11. The method of claim 1, further comprising:
    sending authentication information associated with the IoT device to a radius server; and
    receiving confirmation of authentication success from the radius server.

12. The method of claim 1, further comprising logging off the IoT device if the IoT device is nonfunctional or removed from a network.

13. A system comprising:
    a memory; and
    a processor configured to execute instructions which, when executed, cause the processor to:
    receive classification information identifying that an internet of things (IoT) device is connected to a port of a switch;
    configure a logoff timer for the port based on configuration data of the IoT device;
    determine that the IoT device has been inactive for a predetermined threshold period of time based on the logoff timer;
    receive a packet from the IoT device in response to a wakeup signal;
    reset the logoff timer, wherein resetting the logoff timer causes the IoT device to remain in an authenticated state;
    authenticate the IoT device by a network server based on authentication data associated with the IoT device; and
    configure the port of the switch by a network controller based on one of a device profile and a device fingerprint associated with the IoT device.

14. The system of claim 13, wherein the wakeup signal is based on a guaranteed wakeup timer advertised by the IoT device.

15. The system of claim 13, wherein the wakeup signal is a Wake-on-LAN packet sent from the switch to the IoT device.

16. The system of claim 13, wherein the classification information is based on one of the device profile and the device fingerprint.

17. The system of claim 13, further comprising instructions which, when executed, cause the processor to change the logoff timer to match a timer configuration of the IoT device.

18. A non-transitory machine-readable storage medium comprising machine-readable instructions for causing a processor to execute a method, the method comprising:
    receiving classification information identifying that an internet of things (IoT) device is connected to a port of a switch;
    determining that the IoT device has been inactive for a predetermined threshold period of time based on a logoff timer configured for the port;
    transmitting a first packet from the switch to the IoT device, wherein the first packet comprises a Wake-on-LAN packet;

receiving a second packet from the IoT device in response to the first packet;

resetting the logoff timer, wherein resetting the logoff timer causes the IoT device to remain in an authenticated state;

authenticating the IoT device by a network server based on authentication data associated with the IoT device; and configuring the port of the switch by a network controller based on one of a device profile and a device fingerprint associated with the IoT device.

19. The non-transitory machine-readable storage medium of claim 18, further comprising determining whether a guaranteed wakeup timer is configured on the IoT device, wherein the guaranteed wakeup timer is advertised by the IoT device via a link layer discovery protocol (LLDP).

\* \* \* \* \*